United States Patent
Hayashihara

(10) Patent No.: US 10,145,952 B2
(45) Date of Patent: Dec. 4, 2018

(54) VEHICLE-MOUNTED RADAR DEVICE

(71) Applicant: Veoneer Sweden AB, Vårgårda (SE)

(72) Inventor: Jin Hayashihara, Yokohama (JP)

(73) Assignee: VEONEER SWEDEN AB, Vargarda (SE)

(*) Notice: Subject to any disclaimer, the term of this patent is extended or adjusted under 35 U.S.C. 154(b) by 363 days.

(21) Appl. No.: 15/021,510

(22) PCT Filed: Sep. 9, 2014

(86) PCT No.: PCT/JP2014/073775
§ 371 (c)(1),
(2) Date: Mar. 11, 2016

(87) PCT Pub. No.: WO2015/045849
PCT Pub. Date: Apr. 2, 2015

(65) Prior Publication Data
US 2016/0223670 A1    Aug. 4, 2016

(30) Foreign Application Priority Data
Sep. 27, 2013 (JP) .................................. 2013-202599

(51) Int. Cl.
*G01S 13/42* (2006.01)
*G01S 13/93* (2006.01)
(Continued)

(52) U.S. Cl.
CPC ............ *G01S 13/931* (2013.01); *G01S 7/032* (2013.01); *G01S 13/42* (2013.01);
(Continued)

(58) Field of Classification Search
CPC .. G01S 13/42; G01S 13/931; G01S 2007/027; G01S 2013/9375; G01S 2013/9378; G01S 7/032
(Continued)

(56) References Cited

U.S. PATENT DOCUMENTS

2003/0169199 A1* 9/2003 Kondo .................... G01S 7/032
342/175

FOREIGN PATENT DOCUMENTS

| JP | 2003-215233 | 7/2003 |
| JP | 2010-117218 | 5/2010 |
| JP | 2012-225731 | 11/2012 |

OTHER PUBLICATIONS

PCT International Search Report—dated Aug. 12, 2014.

* cited by examiner

*Primary Examiner* — Timothy A Brainard
(74) *Attorney, Agent, or Firm* — Brinks Gilson & Lione

(57) ABSTRACT

A vehicle-mounted radar device providing stabilized performance and enabling a radar main body to be installed easily on a radar bracket. Radar device 100 includes radar main body 106 and a radar bracket 108 for installing on a vehicle. The radar bracket 108 forms an opening area 140 which exposes a transmission and reception surface 112 of the radar main body 106. One or more support parts which are provided on the side plate part 116, and support the radar main body 106 by contacting a side surface 128, or the transmission and reception surface 112 form a withdrawn shape 160 at the end of each of the support parts near the center of the transmission and reception surface 112 and is inclined toward the side distant from the center of the transmission and reception surface 112 and toward the outside of the vehicle.

6 Claims, 6 Drawing Sheets

(51) Int. Cl.
   *G01S 7/03* (2006.01)
   *G01S 7/02* (2006.01)
(52) U.S. Cl.
   CPC . *G01S 2007/027* (2013.01); *G01S 2013/9375* (2013.01); *G01S 2013/9378* (2013.01)
(58) Field of Classification Search
   USPC .......................................................... 342/70
   See application file for complete search history.

(a)

CROSS-SECTION A-A (b)

VEHICLE-MOUNTED RADAR DEVICE

CROSS REFERENCE TO RELATED APPLICATIONS

This application claims priority to Japanese Application No. 2013-202599, filed on Sep. 27, 2013 and PCT/JP2014/073775, filed on Sep. 9, 2014.

BACKGROUND OF THE INVENTION

Field of the Invention

The present invention relates to a vehicle-mounted radar device provided with a radar main body and a radar bracket for installing the radar main body on a vehicle.

Description of the Related Art

In recent years, passenger vehicles provided with vehicle-mounted radar devices have become commonplace. A vehicle-mounted radar device measures the distance and direction to other vehicles and/or obstacles, etc., and serves to assist lane changing and/or collision avoidance braking. Apart from this, a vehicle-mounted radar device is also used to issue prescribed warnings, etc. to the driver, or to control various vehicle-mounted devices, such as seatbelts and airbags. A vehicle-mounted radar device of this kind is installed in the front or rear part of the vehicle, etc., by mainly using a radar bracket (see Japanese Patent Application Publication No. 2010-66092).

SUMMARY OF THE INVENTION

In order for the vehicle-mounted radar device to exhibit sufficient radar performance, it is necessary for the device to transmit radio waves stably in a desired direction. Therefore, in order to avoid interference with the radio waves, it is desirable to reduce the installation of other members in the vicinity of the antenna (transmission and reception surface) of the radar main body, as far as possible. However, in the radar main body of a general vehicle-mounted radar device, the surface area of the transmission and reception surface is relatively large and therefore the radar beam area which indicates the transmission range of the radio waves from the transmission and reception surface also becomes broader, and a portion or the like of the radar bracket is liable to be interposed in the radar beam area. Furthermore, it is also desirable for the radar main body and the radar bracket to be easy to assemble.

The present invention was devised in view of these problems, an object thereof being to provide a vehicle-mounted radar device which can contribute to stabilizing radar performance and in which a radar main body can be installed easily on a radar bracket.

In order to achieve the abovementioned object, a representative configuration of a vehicle-mounted radar device according to the present invention includes: a radar main body which is a flat cuboid, and has a transmission and reception surface for transmitting and receiving radio waves, the transmission and reception surface being provided as one of two major face surfaces having the largest surface area; and a radar bracket into which the radar main body is fitted such that the radar main body is installed on a vehicle in such a manner that the transmission and reception surface is facing the outside of the vehicle, wherein the radar bracket includes: a plurality of side plate parts supporting side surfaces of the radar main body other than the two surfaces having the largest surface area; a bottom plate part which supports a bottom major face surface that is on the opposite side of the radar main body from the transmission and reception surface; an opening area which exposes the transmission and reception surface of the radar main body; one or more support parts which are provided on the side plate parts and which support the radar main body by contacting the side surfaces or the transmission and reception surface of the radar main body such that the radar main body does not move; and a withdrawn shape which is formed at an end of each of the support parts that is near the center of the transmission and reception surface of the radar main body, and which is inclined or curved toward the side distant from the center and toward the outside of the vehicle.

The radar bracket is configured in such a manner that, although the opening area is large, the radar main body is supported so as not to move by the support parts. In particular, a withdrawn shape is formed in the support parts so as not to interfere with the radio waves transmitted from the transmission and reception surface of the radar main body. Therefore, the radar main body is installed stably in the vehicle and is able to exhibit stable radar performance.

The radar bracket may further include an introduction opening which is provided in a position corresponding to one of four side surfaces of the radar main body, and by which the radar main body can be introduced into the radar bracket from the one side surface, the support parts may include a bridge part which spans the two opposing side plate parts near the introduction opening and contacts the transmission and reception surface of the radar main body, and the withdrawn shape of the bridge part may be provided along an end of the bridge part that is near the center of the transmission and reception surface of the radar main body, among two ends of the bridge part along the longitudinal direction thereof.

In the configuration described above, by introducing the radar main body into the radar bracket from the introduction opening and then supporting the radar main body by the bridge part, it is possible to assemble the radar main body and the radar bracket simply and adequately. Since a withdrawn shape is formed in the bridge part, then interference of the bridge part with the radio waves is avoided, and the radar main body can exhibit stable radar performance.

The support parts may include a rib which projects toward a side surface of the radar main body from the side plate part and which supports the side surface. Due to the rib of this kind, it is possible to support the radar main body appropriately, while avoiding interference with the radio waves by forming a withdrawn shape.

The support parts may include a hook part which projects toward the center of the transmission and reception surface of the radar main body from a portion of the side plate part that is on the outside of the vehicle, and which supports the transmission and reception surface. Due to the hook part of this kind, it is possible to support the radar main body appropriately, while avoiding interference with the radio waves by forming a withdrawn shape.

The transmission and reception surface may include: a relatively broad transmission area which is located in the center of the opening area and which transmits radio waves; and a relatively narrow non-transmission area which is located at a periphery of the transmission area and which does not transmit radio waves, and the support parts are provided outside a radar beam area which spreads radially from the transmission area toward the outside of the vehicle. According to this configuration, it is possible to achieve support parts which do not affect the radar performance of the radar main body.

According to the present invention, it is possible to provide a vehicle-mounted radar device which can contribute to stabilizing radar performance and in which a radar main body can be installed easily on a radar bracket.

DESCRIPTION OF THE PREFERRED EMBODIMENTS

Figure 1:
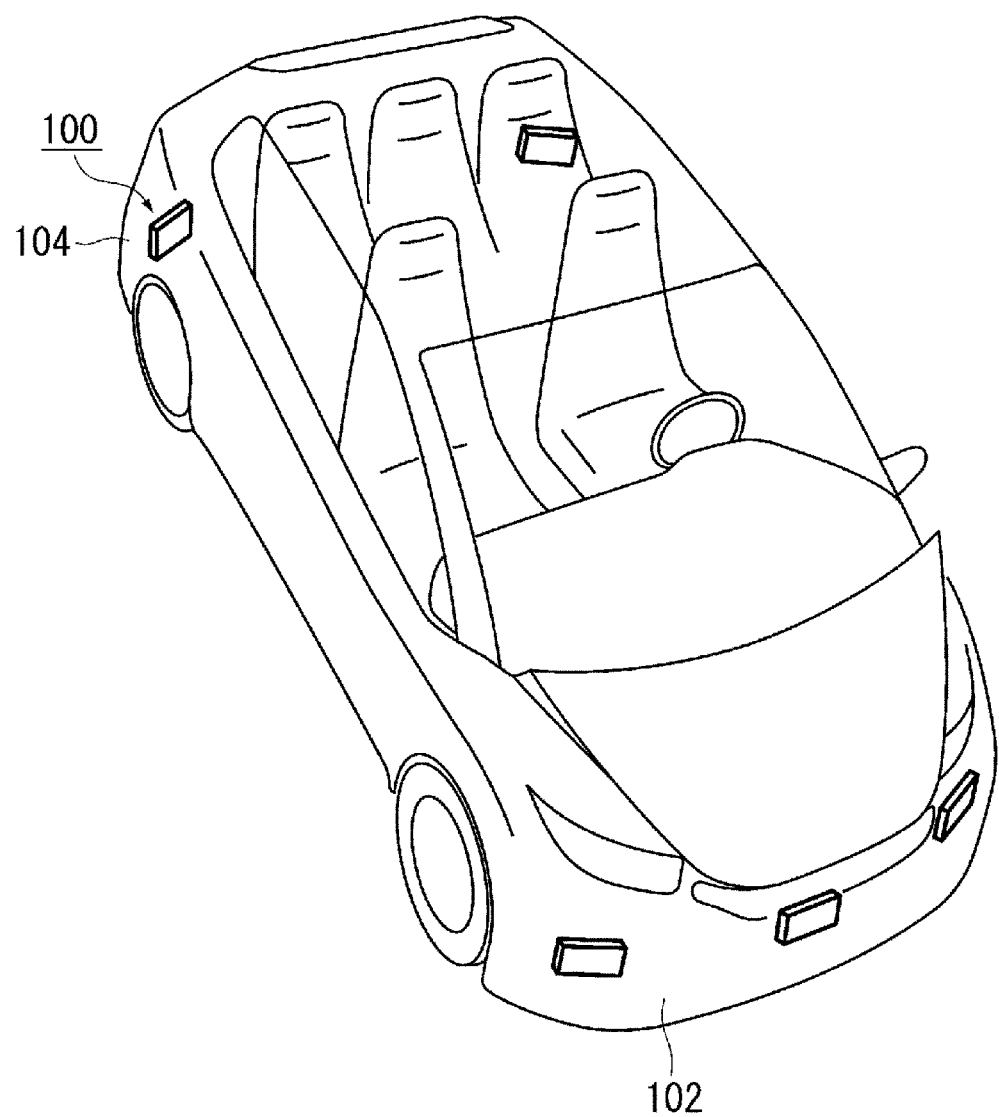
FIG. 1 is a diagram showing an example of a vehicle-mounted radar device according to an embodiment of the present invention.

Below, a preferred embodiment of the present invention is described in detail with reference to the accompanying drawings. The dimensions, materials, other specific values, etc. indicated in the embodiments are merely examples for facilitating understanding of the invention and are not intended to limit the present invention, unless expressly indicated otherwise. In the present specification and drawings, elements having substantially the same function and configuration are labelled with the same reference numerals and repeated description thereof is omitted, and furthermore, elements that do not have a direct relationship to the present invention are also omitted from the drawings.

FIG. 1 is a diagram showing an example of a vehicle-mounted radar device according to an embodiment of the present invention. The radar device 100 shown in FIG. 1 measures the distance to and position of other vehicles, obstacles, etc., by transmission and reception of radio waves. A plurality of the radar devices 100 are disposed, for example, near the rear side of the front bumper 102 in the front part of the vehicle, or near the rear side of the rear bumper 104 in the rear part of the vehicle. For example, in the vehicle in FIG. 1, three radar devices are disposed on the front bumper 102 side and two radar devices are disposed on the rear bumper 104 side.

Figure 2:
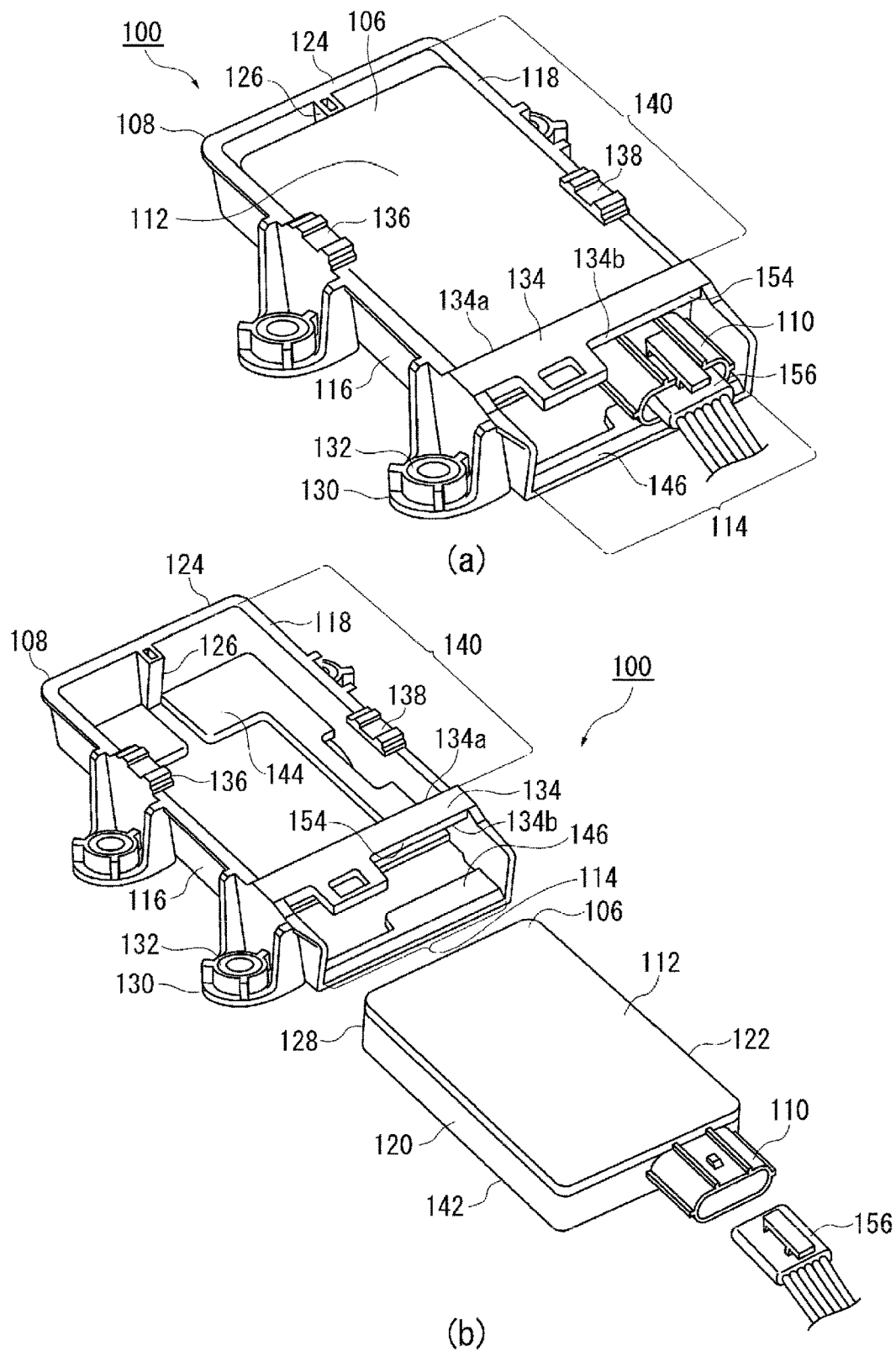
FIGS. 2A and 2B are perspective diagrams showing a simplified view of the vehicle-mounted radar device in FIG. 1.

FIGS. 2A and 2B are perspective diagrams showing a simplified view of the vehicle-mounted radar device 100 in FIG. 1. As shown in the example in FIG. 2A, the radar devices 100 each include a radar main body 106 which transmits and receives radio waves and a radar bracket 108 for installing the radar main body 106 at a respective location on the vehicle. The radar main body 106 is connected electrically to the vehicle via a connector 110 and transmits and receives radio waves to and from target objects.

FIG. 2B is an exploded diagram of the radar device 100 in FIG. 2A. As shown in FIG. 2B, the radar main body 106 is a flat cuboid, of which one of the two major face surfaces having the largest surface area, among the six surfaces, forms a radio wave transmission and reception surface 112 and the other major face surface forms a bottom surface. Electronic components of various types, and the like, are provided inside the radar main body 106, and radio waves are transmitted from and received by this transmission and reception surface 112.

The radar bracket 108 is made of resin and is integrally molded so as to form a box shape following the shape of the radar main body 106. The radar bracket 108 is provided with a large opening area 140, and is configured so that the transmission and reception surface of the radar main body is exposed via the opening area 140. An introduction opening 114 is provided in the radar bracket 108 at a position corresponding to the side surface of the radar main body, and the radar main body 106 is introduced into the introduction opening 114 in a direction parallel to the transmission and reception surface 112 from the side surface.

The side plate parts of the radar bracket are provided following the side surfaces of the radar main body. The side plate parts 116, 118 follow the two parallel side surfaces 120 and 122 which are the long edges of the radar main body 106, and the radar main body 106 is fitted into the radar bracket so as to slide between the side plate parts 116 and 118. A side plate part 124 following a short edge of the radar main body 106 is provided at the back in the direction of introduction of the radar main body 106.

A bottom plate part 144 is provided in the radar bracket 108 on the side of the bottom surface 142 of the radar main body 106 (the side opposite to the transmission and reception surface 112). The bottom plate part 144 is configured such that the central portion thereof is thinned, and the bottom plate part 144 supports the bottom surface 142 of the radar main body 106.

Fixing parts 130 are provided respectively on the outer sides of the side plate parts. Metal bearings 132 are disposed in the fixing parts 130, and bolts, or the like, can be used therein. By using these fixing parts 130, the radar bracket 108 is fixed to the vehicle in such a manner that the transmission and reception surface 112 of the radar main body 106 faces the outside of the vehicle.

A plurality of support parts which support the radar main body 106 are provided in the radar bracket 108 in such a manner that that radar main body 106 does not move. In the present embodiment, a first bridge part 134, a rib 126 and hook parts 136 and 138 are provided as support parts. By these respective support parts, the radar bracket 108 is able to reliably hold and support the radar main body 106, while having an opening area 140 with a large opening.

The first bridge part 134 spans the side plate parts 116, 118 on the side of the transmission and reception surface 112, at one end of the side plate parts 116, 118 in the longitudinal direction. The first bridge part 134 supports a non-transmission area E2 of the radar main body 106 which is positioned at the end of the transmission and reception surface 112 (see FIG. 3).

Figure 3:
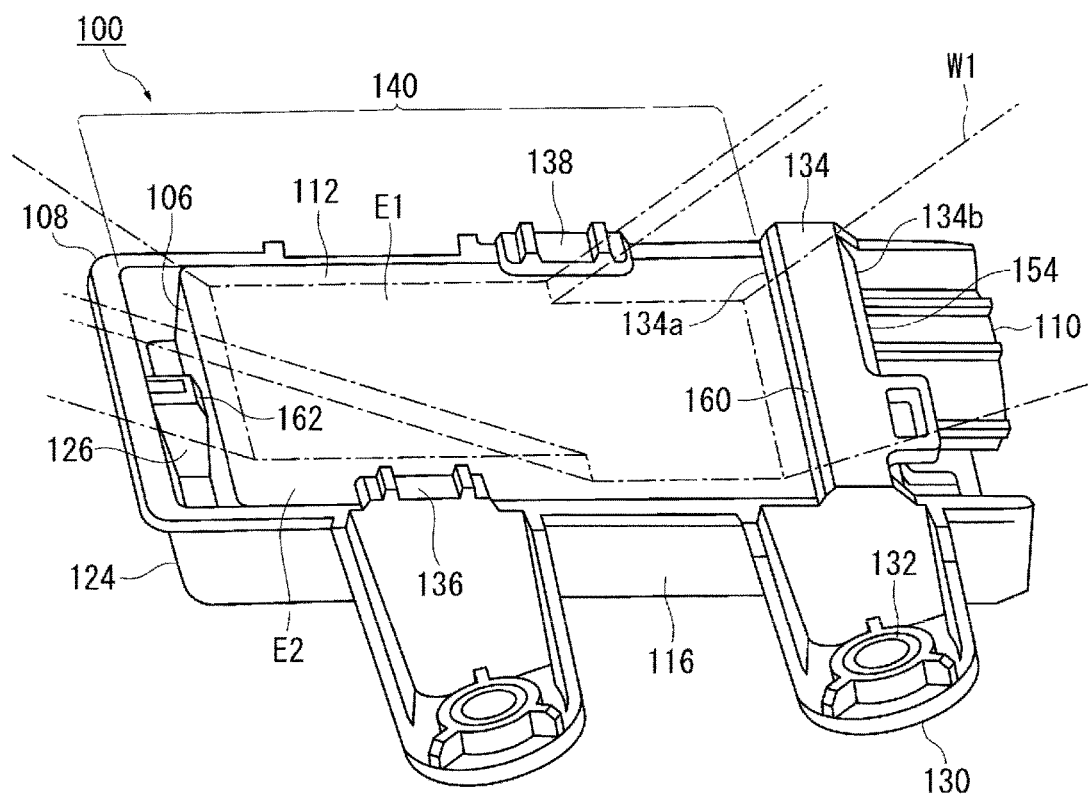
FIG. 3 is a diagram showing an example of a state where radio waves are transmitted from the vehicle-mounted radar device in FIG. 2A.

Here, the radar beam area W1 of the radar device 100 will be described. FIG. 3 is a diagram showing an example of a state where radio waves are transmitted from the vehicle-mounted radar device 100 in FIG. 2A. As shown in the example in FIG. 3, the radar beam area W1, which is the transmission range of radio waves from the radar device 100, broadens radially toward the outside of the vehicle from the transmission area E1 of the transmission and reception surface 112. The transmission area E1 is a relatively broad area which is located on the transmission and reception surface 112, in the central region of the opening area 140. On the other hand, the relatively narrow region of the transmission and reception surface 112 which is located at the periphery of the transmission area E1 is a non-transmission area E2 which does not transmit radio waves. The first bridge part 134 and the hook part 136 contact the non-transmission region E2 and support the transmission and reception surface 112.

Figure 4:
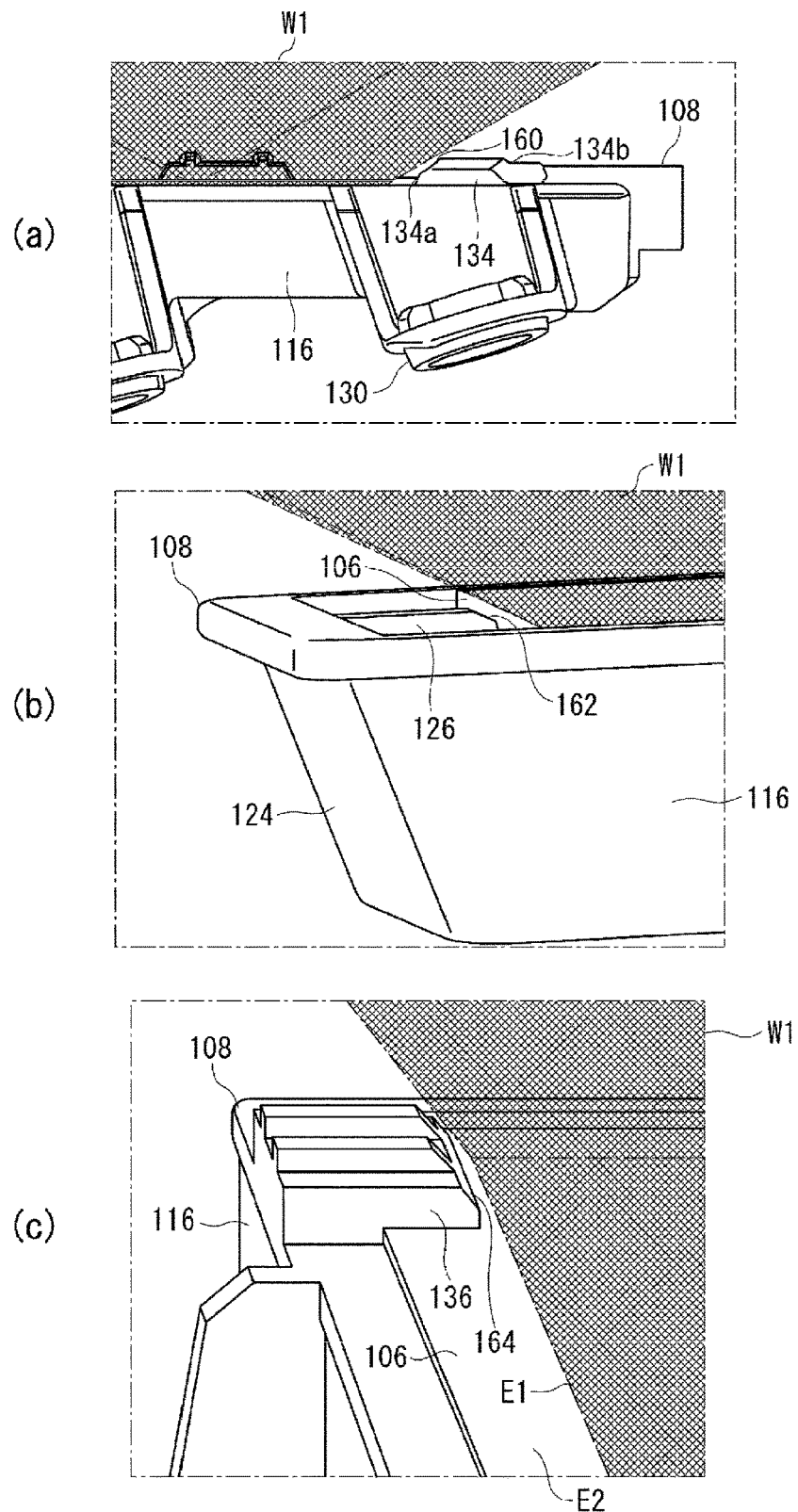
FIGS. 4A to 4C are perspective diagrams showing an enlarged view of the support parts in FIG. 3.

FIG. 4 is a perspective diagram showing an enlarged view of the support parts in FIG. 3. In the example shown in FIG. 4A, a withdrawn shape 160 is formed in the first bridge part 134. Withdrawn shape 160 may also be described as inclined, tapered, or slanted, which is also true for withdrawn shapes 162 and 164. The withdrawn shape 160 is formed in the end section 134a near the center of the transmission and reception surface 112, among the two end sections 134a and 134b following the longitudinal direction of the first bridge part 134 in FIG. 3, and is inclined toward the side distant from the center of the transmission and reception surface 112 and toward the outside of the vehicle. By providing the withdrawn shape 160, interference of the first bridge part 134 with the radar beam area W1 is avoided and the radar main body 106 is able to exhibit radar performance in a stable fashion.

FIG. 4B is a perspective diagram showing an enlarged view of the rib 126 in FIG. 3. The rib 126 projects out toward the side surface 128 of the radar main body 106 from the inside of the side plate part 124, and supports the side surface 128. The upper portion of the rib 126 has a withdrawn shape 162 at the end on the side of the side surface 128. This withdrawn shape 162 is provided on the rib 126 at a position near the transmission and reception surface 112 (see FIG. 3), and is inclined toward the side distant from the center of the transmission and reception surface 112 and toward the outside of the vehicle. By providing this withdrawn shape 162, it is possible to further suppress interference of the rib 126 with the radar beam area W1.

FIG. 4C is a perspective diagram showing an enlarged view of the hook part 136 in FIG. 3. This hook part 136 is also one type of support part. Below, the hook part 136 is described by way of example, but the hook part 138 (see FIG. 3) also has a similar configuration to the hook part 136.

The hook part 136 projects toward the center of the transmission and reception surface 112 of the radar main body 106 from a portion of the side plate part 116 that is on the outside of the vehicle. A withdrawn shape 164 is formed on the end of the hook part 136 near the center of the transmission and reception surface 112, and the withdrawn shape 164 is inclined toward the side distant from the center of the transmission and reception surface 112 and toward the outside of the vehicle. Therefore, it is also possible to avoid interference of the hook part 136 with the radar beam area W1.

Figure 6:
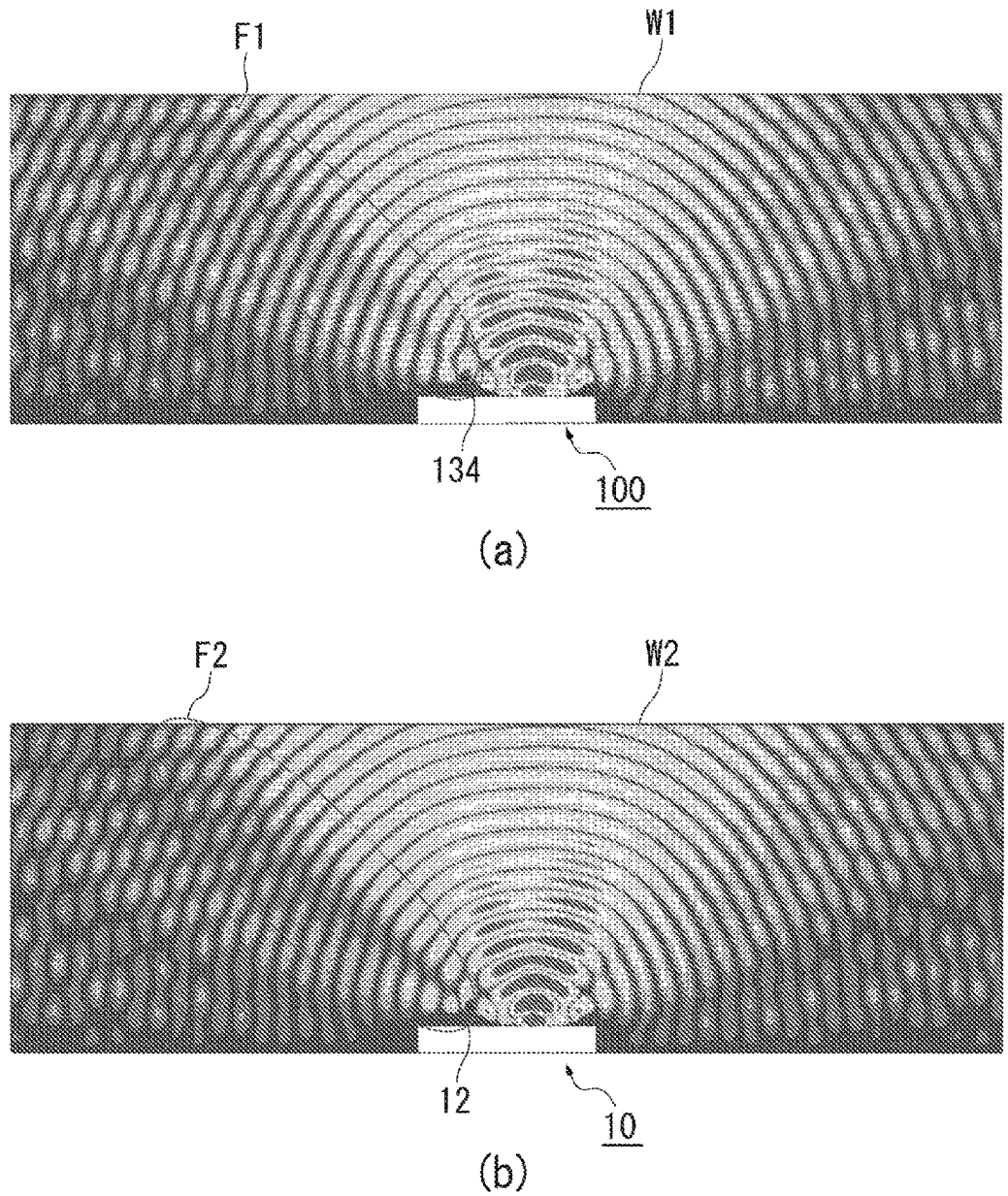
FIGS. 6A and 6B show the results of a simulation of the signal intensity distribution of the radar beam area in the respective radar devices according to the present embodiment and a comparative example.

The beneficial effects of having the support parts described above is now described further by taking the first bridge part 134 as a representative example of the support parts. FIGS. 6A and 6B show the results of a simulation of the signal intensity distribution of the radar beam area in the respective radar devices according to the present embodiment and a comparative example. FIG. 6A shows the signal intensity distribution of a radar device 100 according to the present embodiment, providing a lateral visual view in which the first bridge part 134 is located on the left-hand side of the radar device 100. On the other hand, FIG. 6B shows the signal intensity distribution of the radar device 10 according to a comparative example, which shows an example corresponding to FIG. 6A. This radar device 10 differs from the configuration of the radar device 100 in FIG. 6A in that the withdrawn shape 160 (see FIG. 4A) is not provided in the first bridge part 12.

As can be seen from the signal intensity distribution of the radar device 10 shown in FIG. 6B, a withdrawn shape is not provided in the first bridge part 12 and therefore the signal intensity is slightly weaker in the area F2 adjacent to the first bridge part 12 in the radar beam area W2. This is thought to be because a portion of the corner of the first bridge part 12 interferes, albeit slightly, with the radio waves. On the other hand, in the signal intensity distribution of the radar device 100 according to the present embodiment in FIG. 6A, the signal intensity is stronger in the area F1 adjacent to the first bridge part 134, than in FIG. 6B. In other words, from FIG. 6A, it can be confirmed that interference with radio waves is avoided by providing the first bridge part 134 with a withdrawn shape 160 (see FIG. 4A). The rib 126 (see FIG. 4B) and the hook part 136 (FIG. 4C) which are similarly provided with a withdrawn shape 162 and 164 also have the same effect.

Firstly, the radar bracket 108 can support the radar main body 106 appropriately, by the various support parts, such as the first bridge part 134, the rib 126, and the hook parts 136 and 138 described above. Furthermore, the support parts are provided outside the radar beam area W1 as shown in FIG. 3, and are formed to have withdrawn shapes, as shown in FIGS. 4A to 4C. In particular, the withdrawn shapes are inclined so as to be distanced from the center of the transmission and reception surface 112, toward the outside of the vehicle, and hence interference with the radio waves in the radar beam area W1 can be avoided suitably. Therefore, the radar bracket 108 holds the radar main body 106 adequately, without affecting the radar performance. Therefore, the radar main body 106 is able to exhibit radar performance in a stable fashion. Furthermore, in the radar device 100, even if the radar main body 106 is assembled on the radar bracket 108, it is possible to prevent loss of radar performance of the radar main body 106, or to restrict such loss to an extremely low level, compared to before assembly. Therefore, design, calibration, etc. which takes account of the loss of the radar performance is not required, leading to reduction in labor input and costs. In the present embodiment, the withdrawn shapes are formed as oblique surfaces, but may also be formed as curved surfaces.

In the radar device 100, the radar main body 106 is configured so as to fit without gaps into the radar bracket 108, by means of the support parts described above, and so on. The configuration of the radar bracket 108 is described further below.

Figure 5:
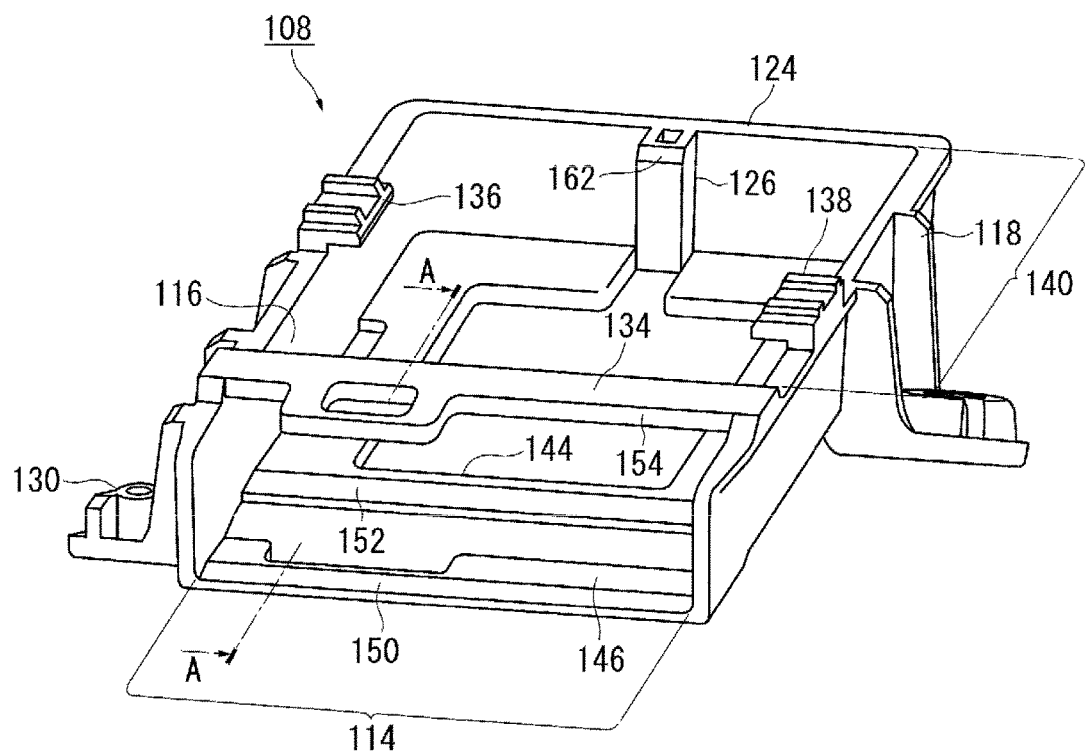
FIGS. 5A and 5B are perspective diagrams showing an example of the radar bracket in FIG. 2B as viewed from the side of an introduction opening.
Figure 5:
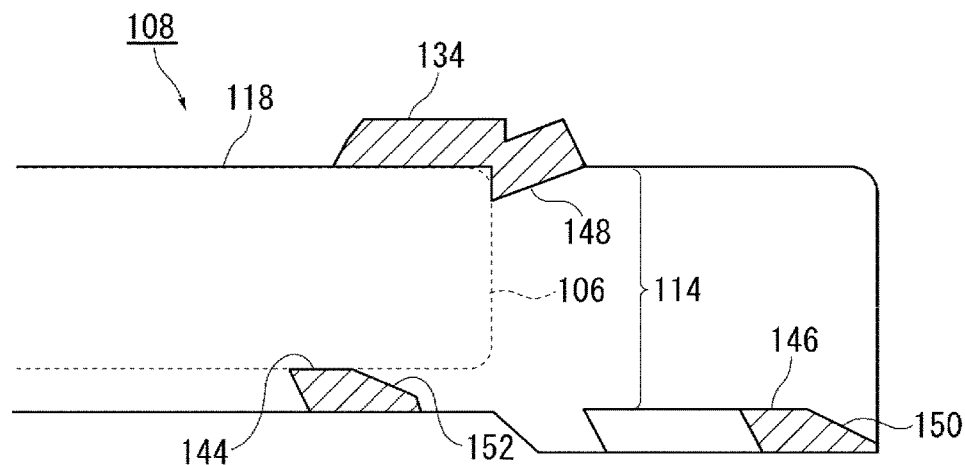

FIG. 5 is a perspective diagram showing an example of the radar bracket 108 in FIG. 2B as viewed from the side of the introduction opening 114. As shown in the example in FIG. 5A, a second bridge part 146 spans between the side plate parts 116 and 118 at one end on the side of the bottom plate part 144. The introduction opening 114 is formed inside the space enclosed by the first bridge part 134, the second bridge part 146 located therebelow, and the side plate parts 116, 118.

As shown in FIG. 2B, the second bridge part 146 is provided at a position on the opposite side of the first bridge part 134, in the direction of introduction into the introduction opening 114. This is a configuration which enables a smooth and easy introduction operation, when fitting the radar main body 106 into the radar bracket 108, by introducing the radar main body 106 into the introduction opening 114 along the second bridge part 146 which is disposed at the front of the introduction opening 114.

FIG. 5B is a schematic cross-sectional diagram along A-A of the radar bracket 108 in FIG. 5A. As shown in the example in FIG. 5B, a projecting part 148 is provided in the first bridge part 134. The projecting part 148 prevents the radar main body 106 from falling off by fitting into the radar main body 106 after introduction has been completed as indicated by the dotted lines. By providing this projecting part 148, the radar main body 106 is fixed so as not to move inside the radar bracket 108, and the positioning accuracy thereof can be raised.

A first slope 150 is provided on the second bridge part 146. The first slope 150 is inclined near the front end of the second bridge part 146 which extends on the opposite side from the introduction opening 114, from the front end side toward the introduction opening 114. As described above, although the projecting part 148 projects from the first bridge part 134, by providing the first slope 150 in the second bridge part 146, it is possible to introduce the radar main body 106 into the introduction opening 114 without any problems.

In addition, a second slope 152 is also provided on the bottom plate part 144. In the present embodiment, the position of the bottom plate part 144 is slightly higher on the side of the first bridge part 134, than on the second bridge part 146. This is because the radar bracket 108 is configured to sandwich and grip the radar main body 106 between the first bridge part 134 and the bottom plate part 144. Therefore, the distance between the first bridge part 134 and the bottom plate part 144 has no spare margin with respect to the thickness of the radar main body 106. Consequently, by providing the second slope 152 on the end of the bottom plate part 144 on the opposite side to the direction of introduction of the radar main body 106, then the radar main body 106 can be introduced more easily.

Reference is made again to FIG. 2A. As shown in the example in FIG. 2A, the connector 110 of the radar main body 106 is provided on a side surface which is exposed via the introduction opening 114, after completing introduction of the radar bracket 108. In this case, a cutaway section 154 is provided in the first bridge part 134 at a position which overlaps with the connector 110. By providing this cutaway section 154, it is possible to detach wiring cords 156 to the connector 110, as appropriate, even after the radar main body 106 has been fitted into the radar bracket 108.

As described above, in the radar device 100, the radar bracket 108 is configured in such a manner that that radar main body 106 can be introduced smoothly therein, while adopting a configuration in which the radar main body 106 is fitted into the radar bracket 108 without any gaps.

In this way, in the present embodiment, the radar main body 106 and the radar bracket 108 can be assembled easily and adequately, and it is possible both to improve the positioning accuracy of the radar main body 106 and to facilitate the assembly operation. By raising the positioning accuracy of the radar main body 106, it is possible to ensure that the radar main body 106 exhibits stable radar performance.

In the configuration described above, the second bridge part 146 is disposed in front of the introduction opening 114. However, the invention is not limited to this, and similar beneficial effects can be obtained, for instance, by arranging the second bridge part 146 in a similar position to the first bridge part 134 with respect to the introduction opening 114, and extending all or a portion of the second bridge part 146 to the opposite side from the introduction opening 114. Furthermore, in the configuration described above, the second bridge part 146 is disposed on the front side of the introduction opening 114 and the projecting part 148 is provided on the first bridge part 134, which is on the side of the introduction opening 114. However, the invention is not limited to this, and it is also possible to dispose the first bridge part 134 on the front side, and to provide the projecting part 148 on the second bridge part 146. Furthermore, it is also possible for the same bridge part to both be disposed on the front side of the introduction opening 114, etc. and to be provided with a projecting part 148, for example.

The present invention can be used for a vehicle-mounted radar device provided with a radar main body and a radar bracket for installing the radar main body on a vehicle.

While the above description constitutes the preferred embodiment of the present invention, it will be appreciated that the invention is susceptible to modification, variation and change without departing from the proper scope and fair meaning of the accompanying claims.

What is claimed is:

1. A vehicle-mounted radar device, comprising:
a radar main body in the form of a flat cuboid forming two opposed major face surfaces having an area larger than two pairs of opposed side surfaces of the cuboid,
one of the major face surfaces forming a transmission and reception surface for transmitting and receiving radio waves; and
a radar bracket into which the radar main body is fitted enabling the radar main body to be installed on a vehicle in such a manner that the transmission and reception surface faces outside of the vehicle,
wherein the radar bracket further comprises:
a plurality of side plate parts supporting two of the opposed side surfaces of the radar main body;
a bottom plate part which supports the other of the major face surfaces of the radar main body forming a bottom surface;
an opening area which exposes the transmission and reception surface of the radar main body;
an introduction opening which is provided in a position corresponding to one of theside surfaces of the radar main body, and by which the radar main body can be introduced into the radar bracket,
one or more support parts which are provided on the side plate parts and which support the radar main body by contacting the side surfaces or the transmission and reception surface of the radar main body such that the radar main body is supported; the support parts forming a withdrawn shape which is formed at an end of each of the support parts that is near the center of the transmission and reception surface of the radar main body, and which is inclined or curved toward the side surface distant from the center and toward the outside of the vehicle;
a bridge part which spans two of the opposing side plate parts near the introduction opening and overlies the transmission and reception surface of the radar main body, and
the bridge part forming a withdrawn shape provided along an end of the bridge part that is near the center of the transmission and reception surface of the radar main body, among two ends of the bridge part along the longitudinal direction thereof.

2. The vehicle-mounted radar device according to claim 1, wherein the support parts include a hook part which projects toward the center of the transmission and reception surface of the radar main body from a portion of the side plate part that is on the outside of the vehicle, and which supports the transmission and reception surface.

3. The vehicle-mounted radar device according to claim 1, wherein the transmission and reception surface includes:
a relatively broad transmission area which is located in the center of the opening area and which transmits radio waves; and a relatively narrow non-transmission area which is located at a periphery of the transmission area and which does not transmit radio waves, and the support parts are provided outside a radar beam area which spreads radially from the transmission area toward the outside of the vehicle.

4. A vehicle-mounted radar device, comprising:
a radar main body in the form of a flat cuboid, forming two opposed major face surfaces having an area larger than two pairs of opposed side surfaces of the cuboid, one of the major face surfaces forming a transmission and reception surface for transmitting and receiving radio waves; and
a radar bracket into which the radar main body is fitted enabling the radar main body to be installed on a vehicle in such a manner that the transmission and receptionsurface faces the outside of the vehicle,
wherein the radar bracket further comprises:
a plurality of side plate parts supporting two of the opposed side surfaces of the radar main body;
a bottom plate part which supports the other of the major surfaces of the radar main body forming a bottom surface;
an opening area which exposes the transmission and reception surface of the radar main body;
one or more support parts which are provided on the side plate parts and which support the radar main body by contacting the side surfaces or the transmission and reception surface of the radar main body such that the radar main body is supported;
a withdrawn shape which is formed at an end of each of the support parts that is near the center of the transmission and reception surface of the radar main body, and which is inclined or curved toward the side surface distant from the center and toward the outside of the vehicle; and
wherein the support parts include a rib which projects toward a side surface of the radar main body from the side plate part and which supports the side surface.

5. The vehicle-mounted radar device according to claim 4, wherein the support parts include a hook part which projects toward the center of the transmission and reception surface of the radar main body from a portion of the side plate part that is on the outside of the vehicle, and which supports the transmission and reception surface.

6. The vehicle-mounted radar device according to claim 4, wherein the transmission and reception surface includes:
a relatively broad transmission area which is located in the center of the opening area and which transmits radio waves; and a relatively narrow non-transmission area which is located at a periphery of the transmission area and which does not transmit radio waves, and the support parts are provided outside a radar beam area which spreads radially from the transmission area toward the outside of the vehicle.

* * * * *